F. C. GUERRLICH.
DRIVING MECHANISM.
APPLICATION FILED JAN. 13, 1917.

1,309,518.

Patented July 8, 1919.
5 SHEETS—SHEET 1.

WITNESSES

INVENTOR
Frederick C. Guerrlich
BY
ATTORNEYS

F. C. GUERRLICH.
DRIVING MECHANISM.
APPLICATION FILED JAN. 13, 1917.

1,309,518.

Patented July 8, 1919.
5 SHEETS—SHEET 2.

WITNESSES
C. K. Reichenbach
C. F. Murdock

INVENTOR
Frederick C. Guerrlich
BY Munn & Co.
ATTORNEYS

F. C. GUERRLICH.
DRIVING MECHANISM.
APPLICATION FILED JAN. 13, 1917.
1,309,518.
Patented July 8, 1919.
5 SHEETS—SHEET 3.
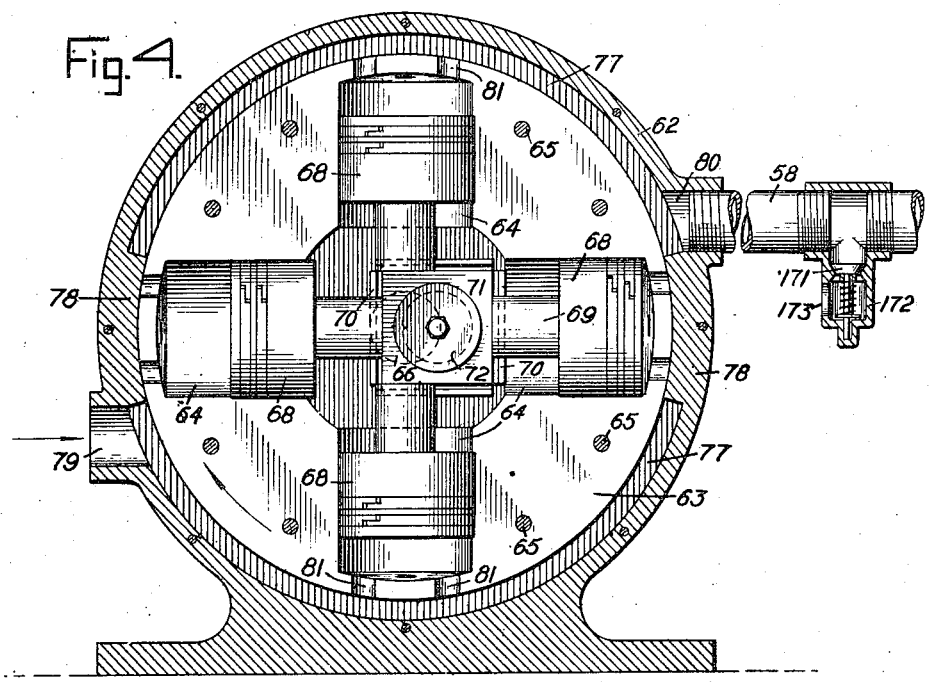
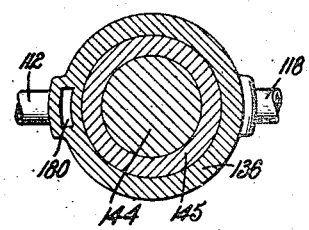
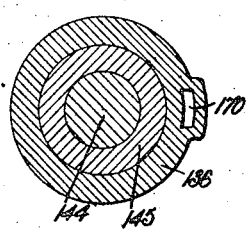
WITNESSES
INVENTOR
Frederick C. Guerrlich
BY
ATTORNEYS F. C. GUERRLICH.
DRIVING MECHANISM.
APPLICATION FILED JAN. 13, 1917.
1,309,518.
Patented July 8, 1919.
5 SHEETS—SHEET 4.
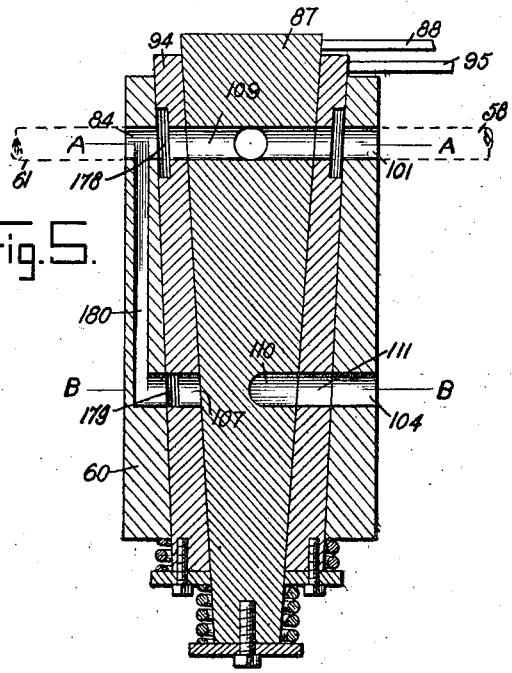
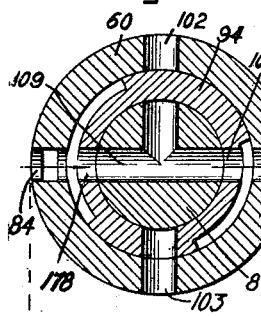 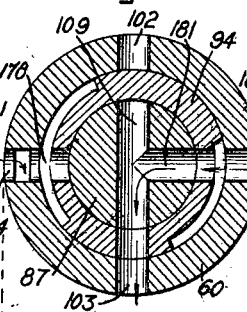 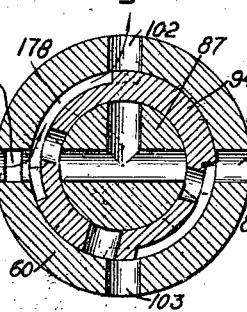 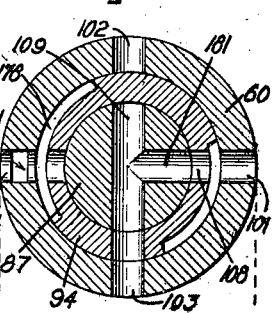
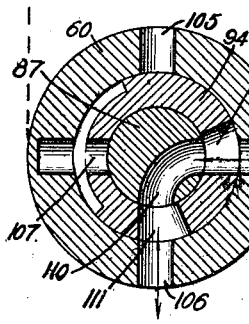 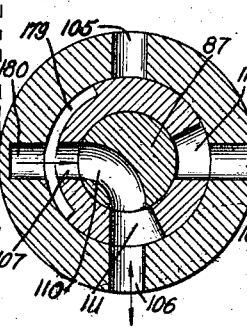 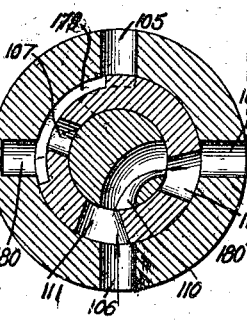 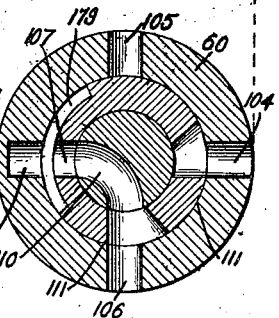
WITNESSES
INVENTOR
Frederick C. Guerrlich
BY
ATTORNEYS

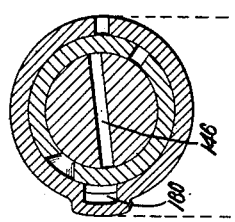
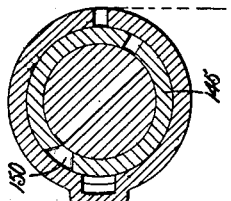
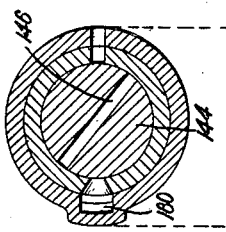
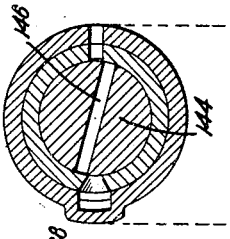
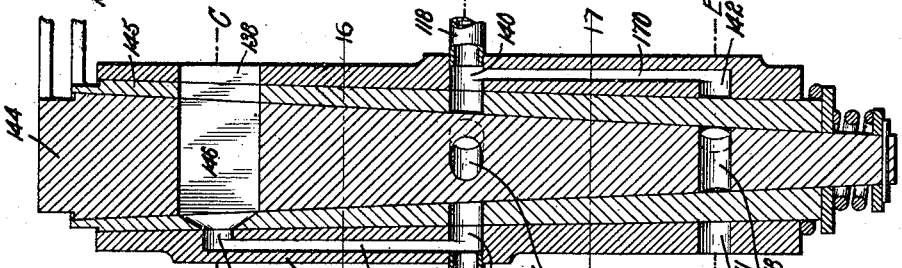

UNITED STATES PATENT OFFICE.

FREDERICK C. GUERRLICH, OF STAMFORD, CONNECTICUT.

DRIVING MECHANISM.

1,309,518.  Specification of Letters Patent.  Patented July 8, 1919.

Application filed January 13, 1917. Serial No. 142,331.

*To all whom it may concern:*

Be it known that I, FREDERICK C. GUERRLICH, a citizen of the United States, and a resident of Stamford, Shippan Point, in the county of Fairfield and State of Connecticut, have invented a new and Improved Driving Mechanism, of which the following is a full, clear, and exact description.

Among the principal objects which the present invention has in view are: To provide a mechanism of the character mentioned with means for gradually varying the effect thereof; to provide means for differentiating the applied power to the operating conditions of the vehicle in which the mechanism is employed; to provide means for balancing the power applied and the resistance thereto as exerted in the mechanism; and to avoid loss through leakage of the power transmission medium.

Drawings.

Fig. 4 is a vertical cross section taken as on the line 4—4 in Fig. 3;

Fig. 5 is a vertical section taken through the speed and direction controlling valve;

Figs. 6 to 9 inclusive, are bracketed views, each showing two horizontal sections of the valve shown in Fig. 5, the sections being taken as on the lines A—A and B—B in said Fig. 5, said views being arranged in pairs, the upper views showing the upper ports arranged to produce various driving effects, while the lower views disclose the lower ports in the valve arranged in correspondence with the positions shown in the upper series;

Fig. 10 is a vertical section of the speed-control valve;

Figs. 11 to 15 inclusive, are bracketed views, each showing three sections, the sections being taken as on the lines C—C, D—D, and E—E, respectively, the views in each bracket disclosing the ports of the valve elements and their correspondents;

Figs. 16 and 17 are horizontal sections of the valve shown in Fig. 10, the sections being taken as on the lines 16—16 and 17—17 respectively in said Fig. 10.

Description.

Figure 1:
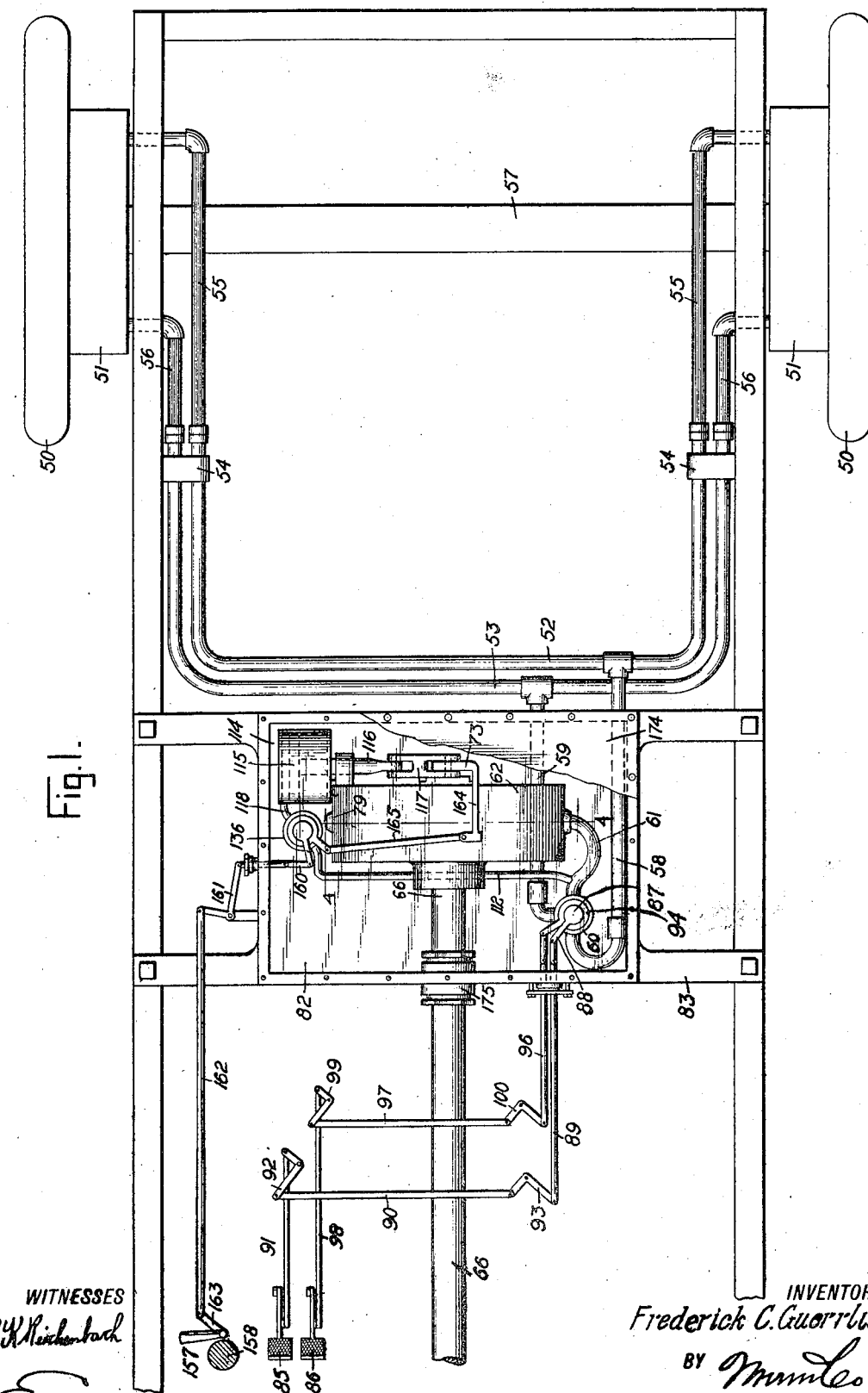
Figure 1 is a top plan view of a portion of an automobile chassis having applied thereto a mechanism constructed and arranged in accordance with the present invention.
Figure 2:
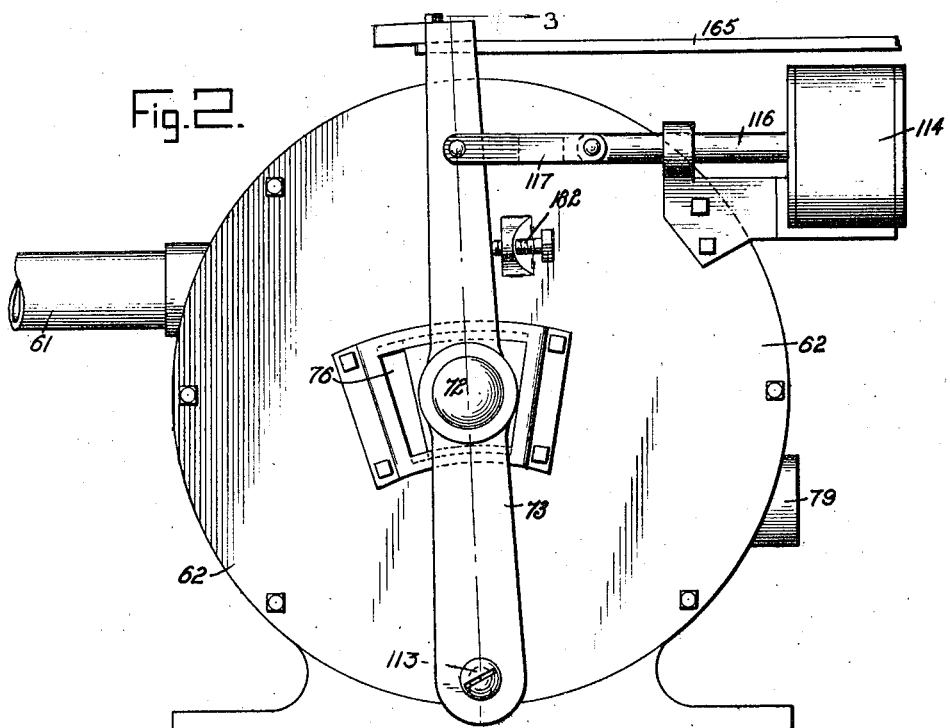
Fig. 2 is a rear elevation on an enlarged scale of the transmission employed in the present invention.

When a driving mechanism constructed and arranged in accordance with the present invention is applied to an automobile, the wheels 50 thereof are each furnished with a fluid-operated motor of any approved and conventional type. The motors are contained in the casing 51, as best seen in Fig. 1 of the drawings. Fluid is delivered to these motors by a system of pipes embodying a main delivery pipe 52 and a main return pipe 53. The pipes 52 and 53 are fixedly mounted on the chassis of an automobile, the brackets 54 being employed for this purpose. Intermediate the ends of the pipes 52 and 53 are flexible tubes 55 and 56. The employment of the tubes 55 and 56 produces the necessary flexibility between the relatively fixed structure embodying the pipes 52 and 53, and the flexible or movable or relatively vibrating structure embodying the axle 57 and the wheels 50, together with the carrying springs connecting the same with the chassis of the automobile. The pipes 52 and 53 are connected by branches 58 and 59 with a valve casing 60. The casing 60 is directly connected by a branch pipe 61 with a fluid pump casing 62, from which the fluid employed to operate the motors in the casing 51 is driven.

Figure 3:
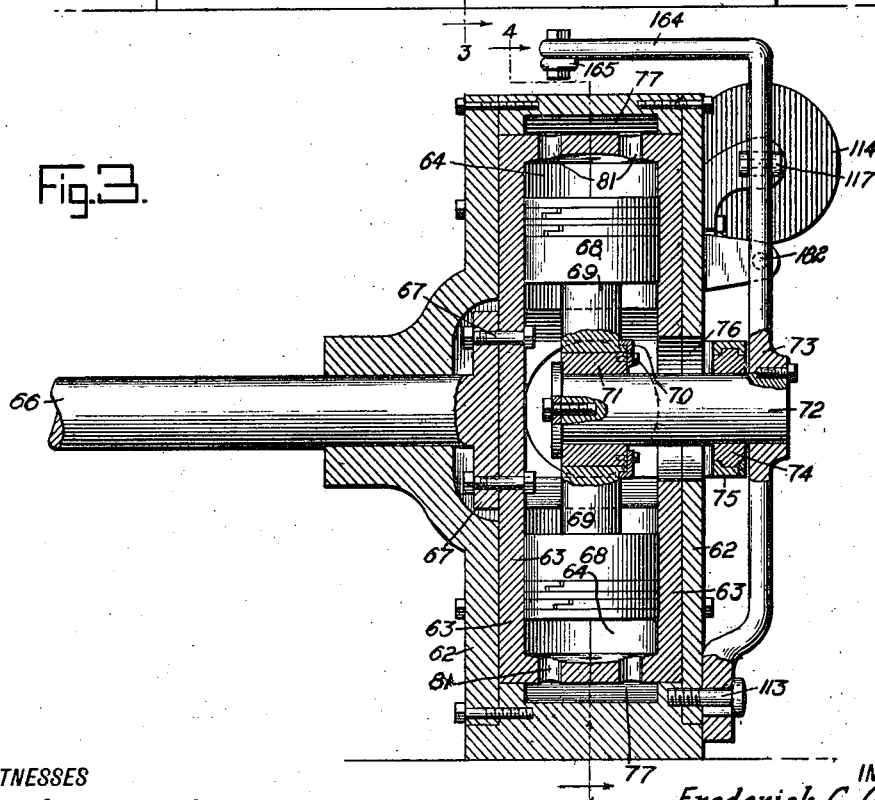
Fig. 3 is a vertical longitudinal section of the transmission mechanism, the section being taken as on the line 3—3 in Fig. 2.

As best seen in Figs. 3 and 4 of the drawings, the casing 62 contains a drum 63. The drum 63 is constructed from two sections, each section having formed therein half cylindrical recesses which register and form cylinders 64 when the two sides of the drum 63 are secured by the bolts 65. The various cylinders 64 are radially disposed with reference to the center of the casing 62 and of the driving shaft 66. The driving shaft 66 is rigidly connected to the rear wall of the drum by bolts 67 or other suitable fasteners.

The shaft 66 is directly connected with a prime mover of any suitable type and when the same is operating is continuously driven thereby, with the result that the drum 63 is continuously rotated in the casing 62 and in a path concentric with the center of the said casing and said shaft.

Reciprocatively mounted in the cylinders 64 are pistons 68. The pistons 68 are each provided with piston rods 69, the ends whereof are grooved for engagement by flanges 70 on a block 71, as best seen in Fig. 3 of the drawings. The block 71 is rotatively mounted on a stud shaft 72, which is fixedly mounted in a lever 73 and is guided and supported by a carrier head 74 in a guide plate 75. The outer wall of the drum 63 is perforated to register with an opening 76 in the face of the casing 62.

From the foregoing it will be seen that when the stud shaft 72 is shifted laterally, the center of the block 71 is moved to and from the center of the shaft 66 and of the casing 62. The shift of the block 71 results in a similar movement of the pistons 68 and piston rods 69 connected therewith. The said block being operatively connected by the flanges 70 with the piston rods 69 and the pistons connected therewith, is moved thereby and caused to rotate on its center or the center of the stud shaft 72. The eccentric relation of the shafts 66 and 72 results in a reciprocatory movement of the pistons in their respective cylinders 64. Thus as shown in Fig. 4 of the drawings, where the center of the block 71 is offset from the center of the shaft 66, the pistons 68 as they pass to the right of the position shown in Fig. 4, are thrust toward the outer end of the cylinders 64, while at the left of the said figure, they are thrust to the inner end of the said cylinders. The intermediate positions, vertical in the said figure, are the result of the lower piston having been partially thrown inward and the upper piston having been forced outward in like degree. It is obvious that as the block 71 is moved toward or away from the center of the casing 62 and of the drum 63, the extent of the movement of the pistons 68 is varied.

The casing 62 is shaped to form an interior chamber having a larger diameter than the drum 63, which is rotated therein. The annular space 77 formed between the outer wall of the drum 63 and the inner wall of the casing 62 is divided by parting walls 78, said walls being diametrically opposed. The said walls serve to form separated chambers, one in open communication with an intake port 79 and the other with a delivery port 80. With these chambers each of the cylinders 64 communicates by means of passages 81, by which the fluid is taken into and ejected from each of the said cylinders.

The casing 62 is preferably immersed in a tank 82, which, as shown in Fig. 1 of the drawings, is supported by a cross frame 83 forming a part of the chassis of the automobile. The port 79 is continuously in open communication with the contents of the tank 82. The port 80 is in open communication with the pipe 61, which pipe conveys the fluid delivered from the cylinders 64 to the valve casing 60 and to the port 84 thereof. The spaces 77 in the lower and upper regions of the casing 62 form, respectively, supply and outlet chambers for the cylinders 64. The space 77 in the lower region of the casing 62 is continuously filled from the tank 82. Therefore, as the drum 63 rotates clockwise, or in the direction shown by the arrow $a$ in Fig. 4, the cylinders 64 are in direct communication with the lower space 77 when either of the passages 81 moves beyond the edge of the wall 78 at the right of said figure.

During the passage of each cylinder past the wall 78 above identified, the piston 68 therein is at the limit of the power stroke and is at the moment passing the dead center of the crank-like action imparted by the block 71 to the piston 68. But the moment each cylinder and the passages 81 thereof pass the partition wall 78 adjacent the delivery port 80, the piston 68 therein is gradually retracted until the said cylinder and its passages 81 are opposite the wall 78 at the left of the said figure. During this period the fluid in the lower space 77 is drawn into each cylinder as the same passes from one to the other of said walls.

From the moment each cylinder passes the wall 78 at the left of Fig. 4 and the passages 81 thereof come into communication with the upper space 77, the piston 68 begins the outward or power stroke and forcefully emits the fluid contained therein into the space 77 from which it is conducted by port 80 and pipe 61 to the valve casing 60 to be passed therethrough to the pipe branches 58 and 59, or to be circulated freely through the said valve casing to the tank 82. When delivered to the pipe branches 58 and 59, the fluid becomes a liquid belt passing through the pipes 52 and 53 respectively, and the motors contained in the casings on the wheels 50. As above indicated, if the liquid is directed through the pipe branch 58 and pipe 52, the vehicle supported on the wheels 50 is driven in a forward direction. If, on the other hand, the fluid is delivered to the pipe branch 59 and pipe 53, the vehicle is driven in a reverse or rearward direction. The selection as to which of the pipe branches shall receive the fluid is manually controlled by means of the foot pedals 85 and 86. The pedal 85 is connected to the plug valve 87 and the crank arm 88 thereof, by rods 89, 90 and 91, which are articulately connected by bell cranks 92 and 93. The pedal 86 is operatively connected with a sleeve valve 94 and the crank arm 95 thereof by rods 96, 97 and 98, and the bell cranks 99 and 100. Obviously, levers could be used in place of the pedals 85 or 86.

As seen best in Figs. 5 to 9 inclusive, the valve casing 60 has two series of ports, the ports being contained in superposed planes. Thus, referring to the said figures, it will be seen that the ports 84, 101, 102 and 103, are in a plane above the plane of the ports 104, 105 and 106. The ports of both series are exposed and closed by the operation of the pedals 85 and 86 and the plug valve 87 and the sleeve valve 94 connected therewith.

When standing and while the motor is running, the transmission stud shaft 72 is nearly concentric with the shaft 66 and the pistons 68 are not forcing any of transmission medium through the pipe 61, and the plug valve 87 is in its normal position, as shown in Figs. 5 and 6. When it is desired to drive the car forward, the stud shaft 72 is brought to a position eccentric to the shaft 66, by operating the lever 157, as hereinafter described, so that the pistons force the medium through the pipe 61.

It will now be noted that the ports 178 and 108 in the sleeve valve 94 coincide with the transverse passage 109 in the plug valve 87 and that the said passage 109 is in line with the ports 84 and 101. It will be remembered the port 84 is in communication with the branch pipe 61, while the port 101 is in communication with the pipe branch 58, pipe 52, and tubes 55 for delivering fluid to the motor in the casing 51 to rotate the wheels 50 progressively. It will also be noted that in the lower series of ports, the port 106 is in communication with the port 104 through a curved passage 110 and ports 111 in the sleeve valve 94. The port 106 is in open communication with the pipe branch 59, which, together with the pipe 53 and tubes 56, return the fluid after passing through the motors to the tank 82. To this end the port 104 is open direct to the tank 82.

It will be observed that when the valves 87 and 94 are in the position shown in Fig. 6, the motors in the casings 51 are driven. The force required to do this, however, is dependent on the movement of the block 71 and the consequent reciprocation of the pistons 68. The inactive position of the block 71 is that in which the said block is concentric with the casing 62 and the shaft 66. Though the valves 87 and 94 were disposed in the position shown in Fig. 6, the motors for driving the wheels 50 would not be affected to drive until the block 71 is shifted so as to become eccentric to the shaft 66 and casing 62, and the amount of power or speed imparted to said motors is dependent upon the extent of the eccentricity of the working position to which the said block is moved.

To shift the block 71 in the manner indicated, the lever 73 is rocked on its pivot 113 by an engine having a cylinder 114, a piston 115, and a piston rod 116. The rod 116 is operatively connected to the lever 73 by a link 117. The piston 115 is moved forward when the fluid contained in the tank 82 is injected into the cylinder 114 behind the said piston, by way of the connecting pipe 118.

The fluid by which the piston 115 is actuated, is transferred under pressure from the tank 82 by means of the main pump. As it will be necessary to have fluid in action when it is desired to move the piston 115, the stud shaft 72 is prevented from ever becoming concentric with the shaft 66, by the set screw 182, the displacement however, being very slight. Thus the motor is constantly circulating a small quantity of the fluid when the vehicle is at rest, and means are provided to allow this fluid to circulate freely without doing work under this condition.

As best seen in Figs. 10 to 15 inclusive, the valve casing 136 has ports 137, 138, 139, 140, 141 and 142. The ports 139 and 140 are operatively connected with the pipes 112 and 118, respectively, the flow of the fluid being controlled by the plug valve 144 and sleeve valve 145. Each of the valves 144 and 145 has an independent series of ports, the former being provided with transverse passages 146, 147 and 148. These passages are in the same plane with the ports 137 and 138, 139 and 140, and 141 and 142, respectively. They are likewise in planes coincident with the ports 150 and 151, 152 and 153, 154 and 155, respectively. The co-disposition of the valves 144 and 145 is requisite to establish or regulate the flow of fluid through the casing 136.

The disposition of the plug valve 144 is manually controlled by means of the hand lever 157, which lever is usually and by preference mounted on the steering post 158. The operative connection between the plug valve 144 and the hand lever 157 includes the arms 159, link 160, bell crank 161, connecting rod 162, and crank arm 163, the assemblage of which is shown in Fig. 1 of the drawings.

The disposition of the sleeve valve 145 is effected by the movement of the piston 115 in the cylinder 114 and the lever 73 operated thereby, and its office is to determine the flow of the fluid when the block 71 has been shifted to the desired working position. To this end, the lever 73 has an arm 164 pivotally connected by means of a rod 165 with a crank arm 166 set out from the said sleeve valve 145. From this it will be seen that the valve 145 is moved in correspondence with the movement of the piston 115. It will also be seen that the piston 115 shifts the lever 73 by overcoming the resistance of the pistons 68 in the drum 63. Naturally the resistance of the movement of the lever 73 and block 71 connected therewith is augmented in correspondence with the increased throw of the pistons 68.

The passage 148 in the plug valve 144 when in open communication with the ports 154 and 155, 141 and 142, as shown best in Fig. 15 of the drawings, provides a relief passage for the fluid held in the cylinder 114, by way of the vertical passage 170, which, as shown in Fig. 10 of the drawings, communicates with the pipe 118. When the relief passage is thus provided, the pressure of the pistons 68 on the block 71 moves the said block toward a position concentric with the casing 62 and shaft 66 by the set screw 182, which is the neutral position for the driving mechanism.

As shown best in Fig. 4 of the drawings, the pipe 58 is furnished with a spring-seated relief valve 171 which opens inward to supply fluid to the said pipe when in the operation of the machine, the motors in the casings 51 tend to draw a supply faster than is delivered by the driving mechanism. The housing 172 in which the valve is mounted has an open passage 173 in communication with the tank 82 and the contents thereof.

*Operation.*

The fluid with which the tank 82, the pipes 52, 53, 58, 59, tubes 55, 56, and casings 51, are filled, is preferably a suitable heavy oil. Any material which adapts itself to the working conditions may be employed. The tank 82 is sealed by a cover 174, and contains besides the fluid mentioned, the mechanism above described. The end of the shaft 66 extends within the tank 82, a gland-packed bearing 175 forming the joint therebetween.

When equipped with mechanism constructed and arranged as above described and charged with a fluid of the character mentioned, the operation of the driving mechanism is as follows: The driver having started the motor for rotating the shaft 66, mounts to his driving station convenient to the pedals 85, 86, and the bent lever 157. The engine shaft 66 being rotated, oil is drawn by the pistons 68 into the casing 62, and through the lower chamber 77 thereof, and is forced from the upper chamber 77 by way of the port 80 and pipe 61 to the valve casing 60, and also by way of the branch pipe 112 to the valve casing 136.

During this period, the plug valve 144 and sleeve valve 145 are in the position shown in Figs. 10 and 11. The plug valve 87 and sleeve valve 94 are as shown in Fig. 7, while the working positions of the pistons 68 are moved inward until the arm 73 rests against the stop 182, so that the block 71 is slightly eccentric with the shaft 66 and casing 62, and the pistons 68 are reciprocating with shortened stroke in the cylinders 64. A small quantity of oil is therefore forced into the pipe 61 and pipe 112 to valve casings 136 and 60, respectively.

It will be noted that the passage for the fluid is now directly open through the valve casing 60, as seen in Fig. 6 of the drawings, to the forward drive of the motors, and that it is also open through the pipe 112, by-pass 180, port 137, passage 146, and port 138, to the tank 82. As the motors offer a resistance to the flow of the fluid while none is offered to its passage through the valve casing 136, the fluid will freely circulate through the pipe 112 as above, and the vehicle will remain stationary. It will be noted that the flow of the fluid is shut off from the passages 147 and 148 of the plug valve 144. The driver now operates the hand lever 157 to place the plug valve 144 in the position shown in Fig. 12, which shows the valve set for lowest speed.

When the valve is set as shown in Fig. 12, the fluid cannot pass to the pipe 118 and the piston 115. Therefore, the movement by the driver of the plug valve 144 has not affected the eccentricity of the block 71 and shaft 66. If a higher speed is desired, the driver moves the valve 144 to the position shown in Fig. 13 of the drawings, thereby increasing the speed. In the first instance, he closes the ports 137, 146 and 138. The fluid can now only go to the valve casing 60, and thus to the motors so that the vehicle moves forward.

If the plug valve 144 be now shifted to the position shown in Fig. 13, it will be noted that while the flow of the fluid has been previously interrupted, a passage is now established through the ports 139, 140, 152, 153 and 147 and pipe 118 to the cylinder 114. The piston 115 is then moved forward, thus increasing the eccentricity of the block 71 with the shaft 66 in the manner above detailed, and so increasing the stroke of the pistons 68 to increase the speed of the vehicle.

The piston 115 shifts the lever 73 and block 71 in the manner mentioned above. Coincidentally the lever 73, by means of the arm 164 and rod 165, rotates the sleeve valve 145 to the position shown in Fig. 14 of the drawings. The piston 115 has shifted the lever 73 and moved the block 71 so that the pistons 68 are now forcing fluid through the pipe 61. Some of the fluid will go to the valve casing 60, and some through the pipe 112 to the port 139. The passage 147 will be in line with the ports 139 and 140, as shown in Fig. 13. The piston 115 will be now pressed forward by the fluid coming from the casing 62, until the sleeve valve 145 has been rotated to the position shown in Fig. 14. The ports 152 and 153 being moved out of register with the passage 147, flow of the oil therethrough is determined. The oil in the cylinder 114 is now trapped to hold the piston 115 and parts connected therewith in the adjusted position. The operation of the pistons 68 thereafter continues until the oil trapped in the cylinder 114 is released.

To release the oil in the cylinder 114, the valve 144 is manipulated by the driver operating the hand lever 157, until the passage 148 is disposed as shown in Fig. 15 of the drawings. It will be noted that in this figure, as in Fig. 14, the sleeve valve 145 remains in the position to which the piston 115 moved the same when shifting the block 71. By reference to Fig. 14 of the drawings, it will be seen that when the sleeve valve 145 was so shifted, the ports 154 and 155 thereof were alined with the ports 141 and 142 of the lower series of ports in the casing 136. It will also be observed by reference to the same figure that the passage 148 on the lower plane of the plug valve 144 is out of line with the ports 154 and 155. By reference to Fig. 15, it will be seen that when the plug valve is shifted to place the valve 144 in the neutral or stopped position—similarly shown in Fig. 16—the passage 148 is alined with the ports 154, 155, 141 and 142, and with the channel or port 170 in open communication with the cylinder 114. This position of the valve permits the oil to flow backward through the pipe 118 from the cylinder 114. The pressure on the piston 68 and the block 71 to center the same, moves the lever 73 and piston 115 to eject the oil from the cylinder 114.

When now the lever 73 returns to its initial position, the valve 145 swings to its initial position, as shown in Fig. 11 of the drawings.

From the foregoing it will be seen that when the driver desires to travel forward, this is accomplished by simply moving the lever 157 slightly in the forward drive position, and as the vehicle gets a little momentum, the lever is moved forward a little more, the momentum of the car being thus gradually increased until the desired speed ratio of the driving means and driven member is obtained. It will also be seen that should the load on the engine be increased by the car, say climbing a hill, the ratio is simply changed, and the driving member given a leverage by simply pulling back the lever 157 until the desired ratio is obtained.

It will be noted that the pedals 85 and 86 are in their normal position in which they may be held by a spring, and that the direction control valves 87 and 94 are in the position shown in Figs. 5 and 6 of the drawings. The oil is delivered by the pipe 61 to the port 84 and is conveyed through the ports 178 and 108 to the port 101 and pipe branch 58 connected therewith. The oil is conveyed by the branch 58 to the pipe 52, where it is distributed and delivered to the tubes 55 and thence to the motors in the casings 51. After passing through the said motors, the oil is returned by the tubes 56 and pipe 53 to the pipe branch 59, which enters the port 106 at a lower level. The curved passage 110 in the plug valve 87 is registered with the ports 111 in the sleeve valve 94 and with the outlet port 104 in the casing 60, which opens to the tank 82. The fluid belt thus employed continues to drive the motors on the wheels 50, so long as the flow is maintained. If the valve 144 is manipulated to increase the power supplied by the pistons 68, the quantity flow of the fluid is augmented with increased speed in the motors on the wheels 50.

If the driver desires to coast, he partially depresses the pedal 86 with the result that the sleeve valve 94 is moved to the position shown in Fig. 8. Here the oil is carried by the lapping passages 178 and 179 to the ports 102 and 105, which are open to the tank 82. The oil in its travel to the passage 179 is conducted by the by-pass 180—shown best in Fig. 5 of the drawings—from the port 84. By referring to Fig. 8, it will be noted that when the valves are in this position, the oil which is returned by way of the pipe branch 59 to the port 106 has free passage through the said port 106, the port 111, the curved passage 110, and the port 104; or, in other words, in this position of the valves the power driven oil entering by way of the pipe 61 and the oil returned by the pipe branch 59 from the motors are unchecked.

By now depressing the pedal 86 further to shift the valve 94 to the position shown by dotted lines in Fig. 8, the fluid is employed as a brake by being driven reversely by the motors. It will be observed that when so shifted, the valve 94 cuts off the supply to the port 101 and the pipe branch 58 connected therewith, and also the port 106, which prevents the flow of the oil from the pipe branch 59. The motors on the wheels 50 are thereby held against rotation. The oil supplied by the pipe 61 is conveyed by the passage 178 and delivered through the port 102 to the tank 82. This condition operates as a drag or brake on the wheels and results in arresting the progress of the vehicle. If, however, it becomes necessary to reverse the wheels or if the driver for any reason determines to operate the vehicle in the reverse direction, this is accomplished by depressing the pedal 85 to the full limit, with the result that the valve 87 is rotated a full quarter revolution from the position shown in Fig. 6 to that shown in Fig. 9. The pedal 86 is released to permit the valve 94 to return to its initial position, such as shown in Fig. 6. In this position of the valves 87 and 94, it will be found that the oil delivered to the port 84 is carried by the by-pass 180 to the passage 179 and port 107. The curved passage 110 now registers with the ports 107, 111 and 106. The port 106 is in communication with the pipe branch 59. Therefore, the oil is driven through the said pipe branch upwardly to and through the pipe 53 and reversely through the motors in the casings 51, to be returned by way of the pipe 52 and pipe branch 58 to the port 101, where it is conveyed by the passage 181 to the passage 109 and thence through the port 103 to the tank 82. So long as circulation is thus maintained, the motors and wheels 50 connected therewith are rotated reversely.

While my invention has been described as it would be used on an automobile and as driving but two rear wheels, it is obvious that it can be used to drive the four wheels by the use of branch pipes, and that it can also be used to drive in other service, such as when employed on motor boats, especially of the twin or triple screw variety. This would simply be accomplished by having the driven motors attached to the propeller shafts instead of to the wheels. It is also obvious that the wheels of an automobile could be driven by a shaft.

*Claims.*

1. A mechanism as characterized comprising a power generator having a rotary supporting frame embodying a plurality of cylinders and piston therefor, means for rotating the said frame, an adjustable member operatively connecting said pistons for moving the same in unison, two valves, and outlets from the cylinders having branches leading to the valves, and means for shifting the said member to positions eccentric to the said frame operable by means leading from one of the valves.

2. A mechanism as characterized comprising a power generator having a rotary supporting frame embodying a plurality of cylinders and pistons therefor, means for rotating said frame, an adjustable member operatively connecting said pistons for moving the same in unison, a motor, a valve, an outlet from the cylinders having branches, one leading to the valve and the other to the motor, and means for shifting the said member to positions eccentric to the said frame operable by means leading from the valve.

3. A mechanism as characterized comprising a power generator having a rotary supporting frame embodying a plurality of cylinders and pistons therefor, means for rotating said frame, an adjustable member operatively connecting said pistons for moving the same in unison, a motor, two valves, an outlet from the cylinders having branches, one leading to each valve, means for shifting the said member to positions eccentric to the said frame operable by means leading from one of the valves, and two outlets from the other valve leading to the motor.

4. A mechanism as characterized comprising a power generator having a rotary supporting frame embodying a plurality of cylinders and pistons therefor, means for rotating said frame, an adjustable member operatively connecting said pistons for moving the same in unison, two valves, an outlet from the cylinders having branches leading to the valves, means for shifting said member to positions eccentric to the said frame operable by means leading from one of the valves, and means operable with said member for modifying the action of the last mentioned valve.

5. A mechanism as characterized comprising a power generator having a rotary supporting frame, embodying a plurality of gyratory cylinders and pistons therefor; means for rotating said frame; an adjustable member operatively connecting said pistons for moving the same in unison, said member being normally eccentric to said frame; power actuated means for shifting said member to positions eccentric to said frame; a manually-controlled mechanism for inaugurating the operation of said power means; and an automatic mechanism for determining the operation of said power means, said automatic mechanism embodying a valve for suspending a supply of power to said power means and operating connections for said valve with said power means.

6. A mechanism as characterized comprising a power-driven shaft; a power generator; a power distributer operatively connected therewith; a shifting member for establishing the working center of the power elements of said generator; and means operatively connecting said shifting member and said distributer for shifting said member, said means embodying a power lever and manual controls therefor.

7. A mechanism as characterized including a power generator, a shifting member for establishing the working center of the power elements of the said generator, means for shifting said member, said means embodying a power lever and manual controls, and means operatively connecting with the said shifting member for modifying the action of the first means.

8. A mechanism as characterized including a power generator, a shifting member for establishing the working center of the power elements of the said generator, means for shifting said member, manual controls for inaugurating action of the said means for shifting the said working center of the power elements, and means operatively connecting with said shifting member for suspending action of the first means.

9. A mechanism as characterized having a power driven shaft, and traction wheels in combination with fluid operated motors, one operatively connected with each of the said wheels, a fluid operating generator, a shifting member for establishing the working center of the power elements of the said generator, means for shifting said member, and a circulating system operatively connecting said generator and said motors and having a branch for modifying the action of the said means.

10. A mechanism as characterized having a power driven shaft, and traction wheels in combination with fluid operated motors, one operatively connected with each of the said wheels, a fluid operating generator, a shifting member for establishing the working center of the power elements of the said generator, a circulating system operatively connecting said generator and said motors, and having a branch, means for shifting said member operable by the pressure in the said branch, manual controls inaugurating action of the said means, and means operatively connected with the said shifting member for suspending action of the first means.

11. A mechanism as characterized having a power driven shaft, and traction wheels in combination with fluid operated motors, one operatively connected with each of the said wheels, a fluid operating generator, a shifting member for establishing the working center of the power elements of the said generator, a circulating system operatively connecting said generator and said motors, and having a branch, means for shifting said member operable by the pressure in the said branch, manual controls inaugurating action of the said means, means operatively connected with the said shifting member for suspending action of the first means, and a container for holding the fluid and in which is disposed the generator and the second mentioned means.

12. A mechanism as characterized comprising a power-driven shaft; a fluid pump operatively connected with said shaft, said pump embodying a frame having therein a plurality of cylinders disposed concentric to said shaft, a plurality of pistons reciprocatively mounted one in each of said cylinders, a shifting member operatively connected with each of said pistons, said member being normally concentric with said shaft and said cylinders; and power means for moving said shifting member in one direction and also in an opposite direction for varying the extent of movement of said pistons, the power for the movement of said member being delivered by said pump.

13. A mechanism as characterized comprising a power-driven shaft; a fluid pump operatively connected with said shaft, said pump embodying a frame having therein a plurality of cylinders disposed concentric to said shaft; a plurality of pistons reciprocatively mounted, one in each of said cylinders; a lever operated shifting member operatively connected with each of said pistons, said member being normally concentric with said shaft and said cylinders; a fluid motor operatively connected with said shifting member; a fluid circulating means connecting with said motor and said pump, and means for controlling the operation of the said motor on the said shifting member.

14. A mechanism as characterized comprising a power generator having a rotary supporting frame embodying a plurality of cylinders and pistons therefor, means for rotating said frame, an adjustable member operatively engaging said pistons for moving the same in unison, a valve, an outlet from the cylinders leading to the valve, and means for shifting the said member to positions eccentric to the said frame operable by means leading from the valve.

15. A mechanism as characterized comprising a power generator having a rotary supporting frame, embodying a plurality of cylinders and pistons therefor, means for rotating said frame, an adjustable member operatively connecting said pistons for moving the same in unison, two valves, an outlet from the cylinders having branches, one leading to each valve, and means for shifting the said member to positions eccentric to the said frame operable by means leading from one of the valves.

In testimony whereof I have signed my name to this specification in the presence of two subscribing witnesses.

FREDERICK C. GUERRLICH.

Witnesses:
C. F. MURDOCK,
PHILIP D. ROLLHAUS.